Dec. 5, 1967     A. J. PARRAGA     3,356,011
AUTOMATIC BEVERAGE BREWING AND DISPENSING MACHINE
Filed Aug. 25, 1965     5 Sheets-Sheet 1

INVENTOR
ALFREDO J. PARRAGA

BY     Imirie and Smiley

ATTORNEYS.

Dec. 5, 1967 A. J. PARRAGA 3,356,011
AUTOMATIC BEVERAGE BREWING AND DISPENSING MACHINE
Filed Aug. 25, 1965 5 Sheets-Sheet 2

INVENTOR
ALFREDO J. PARRAGA

BY

ATTORNEYS.

Dec. 5, 1967 A. J. PARRAGA 3,356,011
AUTOMATIC BEVERAGE BREWING AND DISPENSING MACHINE
Filed Aug. 25, 1965 5 Sheets-Sheet 3

INVENTOR
ALFREDO J. PARRAGA

BY
ATTORNEYS.

INVENTOR
ALFREDO J. PARRAGA

BY

ATTORNEYS

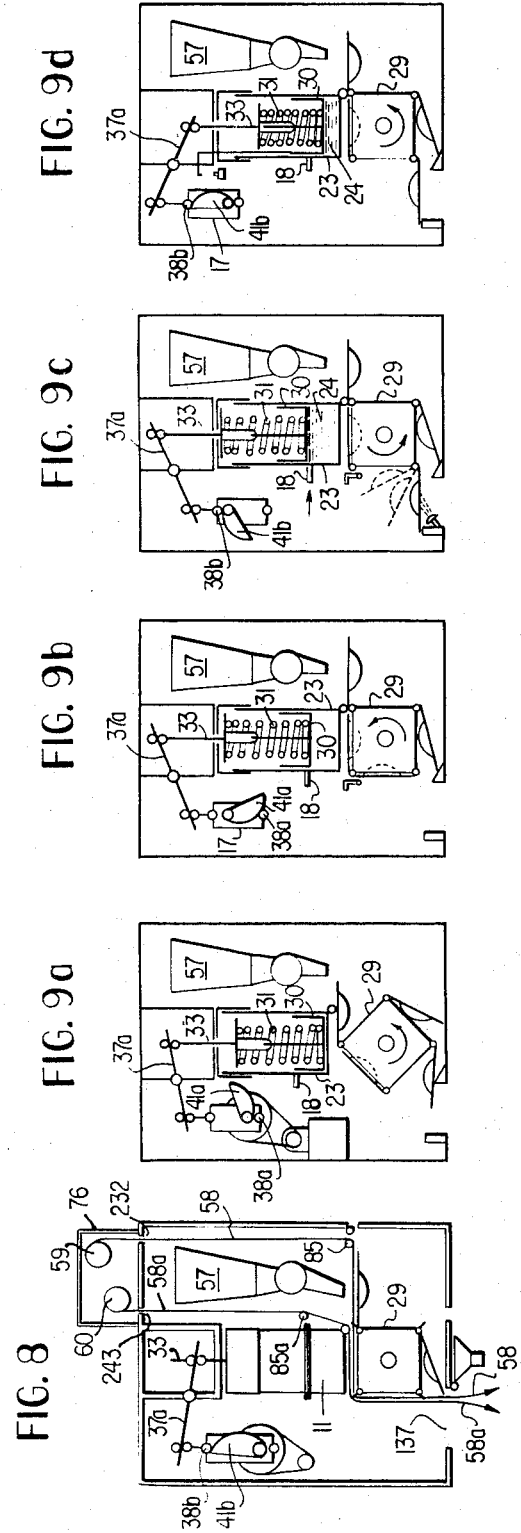

United States Patent Office 3,356,011
Patented Dec. 5, 1967

3,356,011
AUTOMATIC BEVERAGE BREWING AND
DISPENSING MACHINE
Alfredo J. Parraga, 3107 N. Haussen Court,
Chicago, Ill. 60618
Filed Aug. 25, 1965, Ser. No. 482,394
21 Claims. (Cl. 99—289)

This invention relates to an automatic machine for brewing and dispensing coffee, tea, or like beverages.

It is the primary object of the invention to provide an automatic machine which is powered by an electric motor but in which nearly all elements are moved in a brewing cycle by mechanical means linked to said motor.

It is an important object of the invention to provide a machine, of the above described characteristics, in which the hot water, to be infused through the dry beverage grounds to brew the beverage, is mechanically pumped through said grounds by a piston and cylinder arrangement employing a spring whose force supplements the pressure of the piston to force hot water through the grounds for an extended period of time.

Another object of the present invention is to utilize, as a hopper for the beverage grounds, a plastic bag which prior to insertion in the machine retains the grounds in hermetically sealed and fresh condition, said plastic bag being hung on the machine frame and the seal broken at the bag mouth which is then fitted over the neck of a dispenser operative to release a measured quantity of grounds as needed for each brewing cycle.

Yet another important object of the invention is to provide a machine, of the above described characteristics, which is compact and small by virtue of use of a small polysided advancing member having a cavity in each side covered by an outwardly swingable strainer plate, said plates, upon intermittent rotation of the advancing member, receiving a measured quantity of grounds from a dispenser in a receiving station, moving the grounds to an infusing station for passage of hot water from an infuser pump, and subsequently swinging outwardly away from the advancing member and against an abutment in an emptying station where the grounds are thrown from the strainers into a disposal passage.

Still another object of the invention is to provide a machine, of the above described characteristics, wherein a filter paper tape may be fed over a strainer plate in the grounds receiving station and engaged over pins on said advancing member so that the paper tape when supplied with a measured quantity of grounds is moved by the advancing member to the infusing station, and subsequently after brewing is moved downwardly to a waste receptacle so that rinsing of said strainer plate becomes unnecessary.

A further object of the invention is to provide a machine, of the above described characteristics, wherein two rolls of filter tapes may be fed, one to said receiving station and the other to said infusing station, so that grounds dispensed to the first tape are imprisoned at the infusing station between the first and second tapes and sealed between said tapes by movement of said infuser pump and by the brew water, the thus packaged grounds, after brewing, being moved by the said advancing member downwardly into a waste receptacle.

A still further object of the invention is to provide a machine, of the above described characteristics, wherein a roll of tape comprising two strips, between which are prepackaged at spaced intervals the grounds to be brewed, may be fed directly to said infusing station and subsequently moved by the advancing member downwardly into a waste receptacle, and means is provided for preventing the feed of grounds from said hopper and dispenser to the tape.

Still another object of the invention is to provide a machine, of the above described characteristics, which is small and compact, economical to fabricate and use, and which is capable of long periods of trouble free operation.

The novel features that are considered characteristic of the invention are set forth with particularity in the appended claims. The invention itself, however, both as to its organization and its method of operation, together with additional objects and advantages thereof, will best be understood from the following description of specific embodiments when read in connection with the accompanying drawings, wherein like reference characters indicate like parts throughout the several figures and in which:

FIG. 8 is a diagrammatic front elevation to smaller scale of the machine of FIG. 7 adjusted for feeding grounds between two tapes to perform the brewing cycle;

Figure 1:
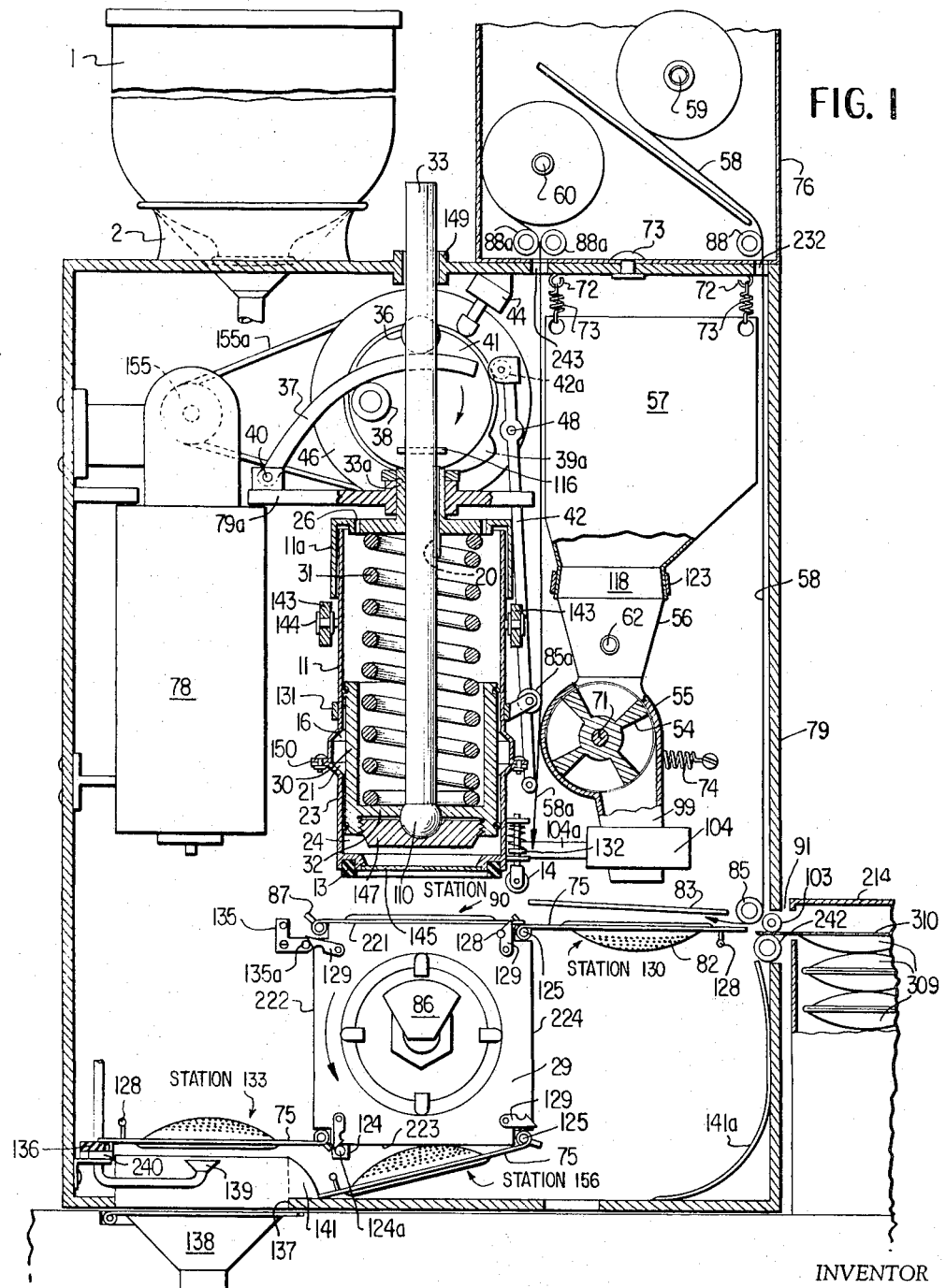
FIG. 1 is a front view partially in section of a machine according to the invention with its enclosing cabinet omitted.
Figure 7:
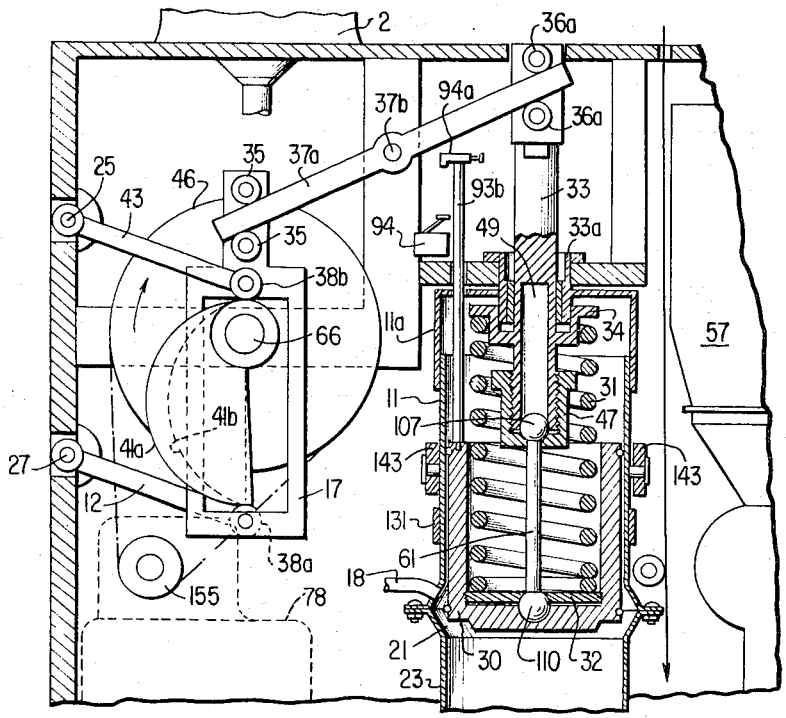
FIG. 7 is a fragmentary front elevation, partially in section, of a modified infuser pump and modified cam drive therefor.

FIGS. 9a–d are diagrammatic illustrations of the machine of FIG. 7 in four different stages of a brewing cycle;

FIGS. 10a–d are diagrammatic illustrations similar to FIGS. 9a–d but of the machine of FIG. 1 modified to utilize a hexagonal advancing member; and FIG. 11 is a fragmentary bottom perspective view of a tape having prepackaged grounds for use in the machine.

Figure 2:
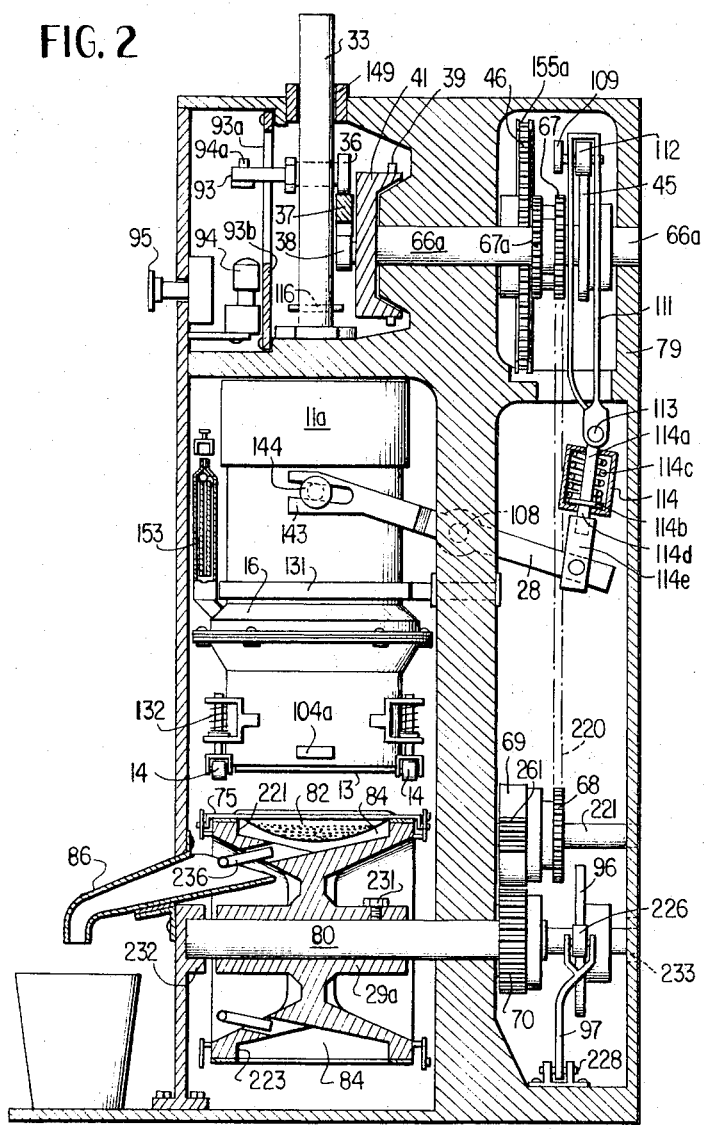
FIG. 2 is a side elevation of the machine shown in FIG. 1 with parts shown in section.

Referring now particularly to the drawings, FIGS. 1 and 2 illustrate a portion of one embodiment of a machine, according to the invention, which is housed in a rectangular supporting frame 79 providing a seat 2 at its top for a replaceable water jug 1 to supply water should pressure in the regular city pressure mains cease for any reason. A heating reservoir 100 is supported at one side at the bottom of frame 79.

The water feed and heating circuit

Figure 6:
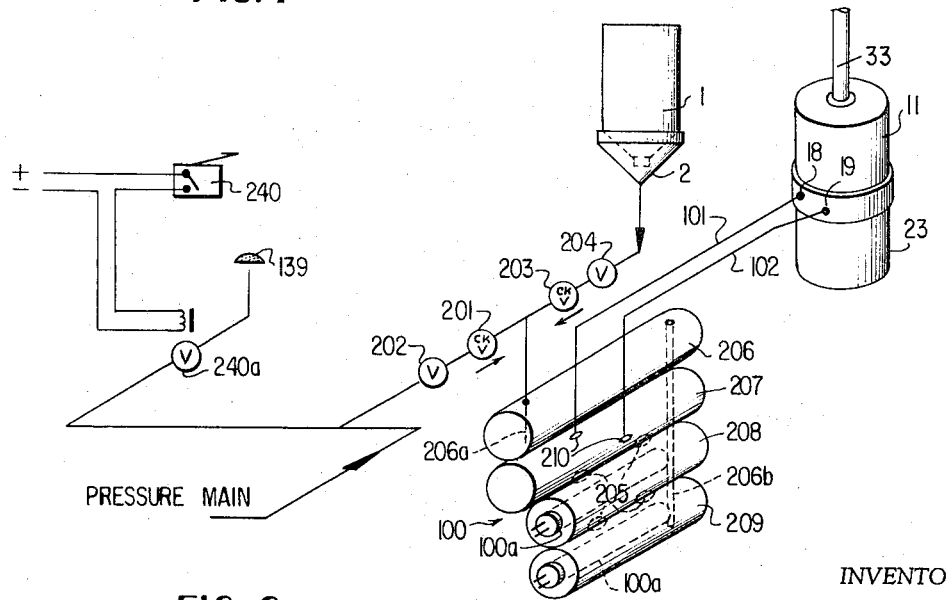
FIG. 6 is a diagram of the fluid circuit for feeding water to and through the machine.

The water feed and heating circuit is best illustrated in the diagram of FIG. 6. The heater tank 100 has two feed branches, one branch connected to the city water pressure main having interposed a check valve 201, and a manually operable globe valve 202 and the other branch, connected to the water jug 1, also having interposed a check valve 203 and a globe valve 204. An operator may close one globe valve and open the other to use water from either source independently. When both sources of water are connected through the globe valves, the city water will flow due to the pressure it exerts and said pressure closes the jug water check valve 203, but if the city water fails to flow, the water from the jug will close check valve 201 and tank 100 will receive water from the jug.

Heater tank 100 is formed by any desired number of short lengths of tubing welded one on top of the other to resist pressure without being deformed. In the illustrated embodiment four lengths are shown. The three lower tubes 207–209 are connected one to another by openings, or conduits 205. The upper tube 206 is fed from the city water source, or jug, by an inlet 206a extended inside down to near the bottom of said upper tube. Tube 206 has an interior conduit 206b which connects from the uppermost interior portion of tube 206 to near the bottom of the lower tube 209.

The upper one 207 of the three lower tubes has two outlets 210 to supply boiling water to the pump 11, to be described, and to form a thermosyphon, that is, to maintain the water in the pump and tank 100 at the same temperature. The two lower tubes 208 and 209 each house a heater element 100a and a thermostat, not shown, which may be either inside or outside the tubes.

The infusor pump

The infusor pump comprises a fixed cylinder portion 11a open at its bottom and secured to an upper bracket arm 79a of the frame 79. Telescoping in part 11a is a cylinder comprising an upper section 11 and a lower section 23, bolted together at meeting flanges and sealed by gasket 150. The meeting ends of sections 11 and 23 are expanded outwardly to form conic chambers 16 and 21 into which hot water is fed and from which hot water is returned through the conduits 18 and 19, FIG. 6. Chambers 16 and 21 together form an expansion in the cylinder which is closed and opened by movement of the piston to be described. The lower section 23 encloses a brewing chamber 24 which is fed by the conduits 18 and 19 connected to the conduits 101 and 102 in FIG. 6, to form with tank 100 a thermosyphon to maintain water in chambers 16, 21 and 24 at the same temperature as the hot water in tank 100. Section 23 is partially closed at the bottom by perforated plate 145 surrounded by a projecting gasket 13. A pair of rollers 14 are supported for vertical movements by springs 132 each positioned between a bracket arm and a support flange on a vertical support rod for the rollers. The bracket arms are fixed to cylinder section 23 and pierced by openings to guide the rods of rollers 14 vertically.

A reciprocating piston 30 is movable within the cylinder sections 11 and 23 and comprises a cylinder closed near its bottom by plate 32 having a central opening with a partially spherical wall receiving the ball end 110 of the piston rod 33. The ball 110 is secured to the piston for angular relative movements by the threaded lock cover 147 having a spherical cavity sealing the ball to form a universal joint. Piston rod 33 moves vertically through collar 33a in the fixed cylinder portion 11a and in an upper guide bearing collar 149 secured in an opening in the top of the frame 79. The fixed cylinder head 11a is provided with breathing openings 26 and the piston 30 is provided with sealing rings at its top and bottom. Play in movement of the piston rod is taken up by the wedge 20 which slides in collar 33a. An abutment ring 116 is fixed to the piston rod for limiting the downward movement of the piston while keeping the spring under compression.

The grounds storing and dispensing means

Figure 3:
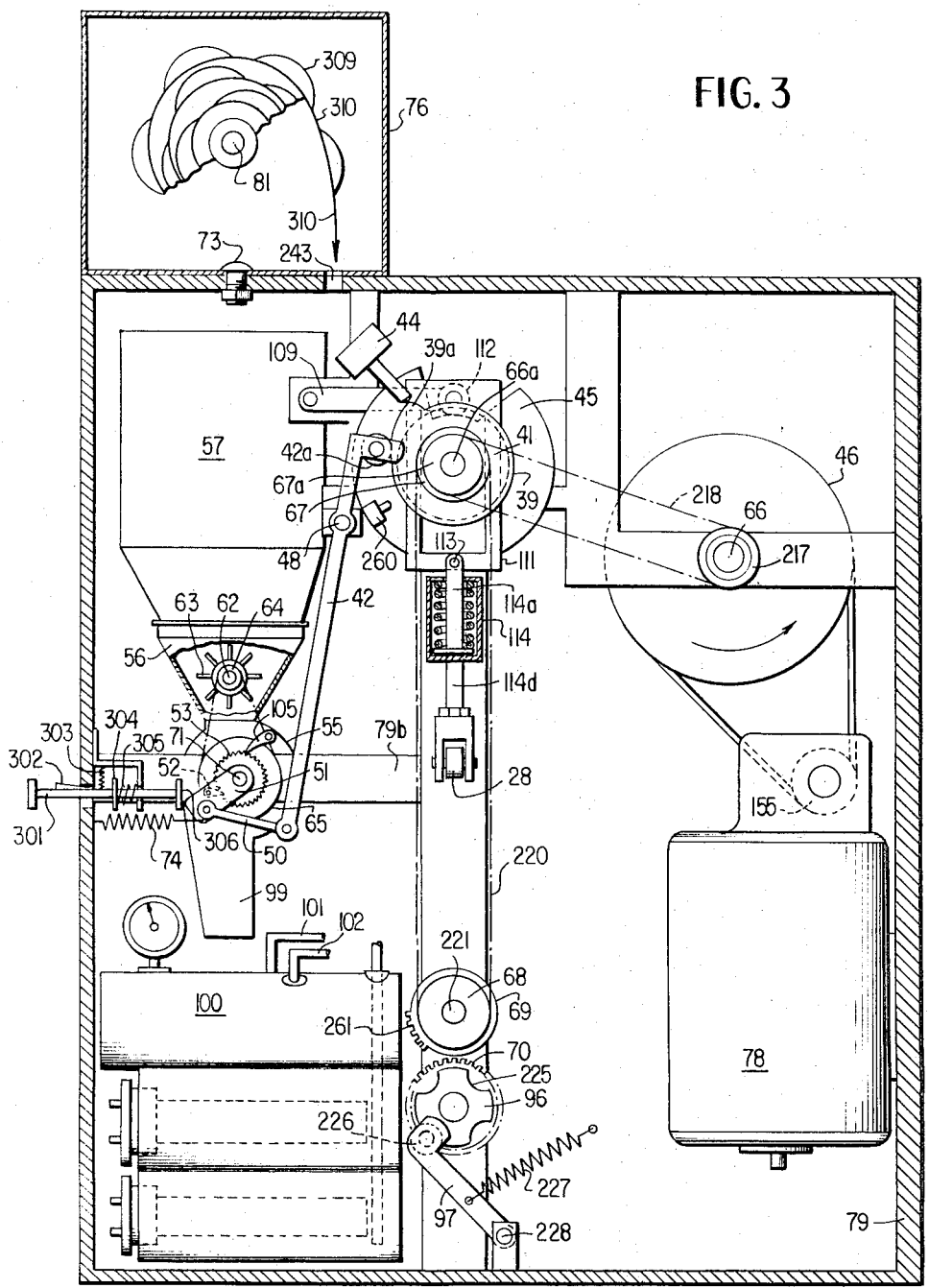
FIG. 3 is a rear elevation of the machine illustrated in FIGS. 1 and 2 with parts positioned as in different stages of a brew cycle and certain parts omitted for clarity of illustration.

Fixed to a cross arm 79b, FIG. 3, of the frame by any suitable means is a cylindrical body 55 enclosing a plurality of radial vanes 54, FIG. 1, fixed to a shaft 71. These vanes define four chambers for receiving and dispensing dry beverage grounds to an integral discharge funnel 99, each chamber being of equal volume appropriate to receive an amount of the grounds suitable to brew one cup of beverage. Integrally secured to the top of chamber 55 is a funnel-like body 56 opening at the bottom into the measuring chambers and being provided with a frusto-conical upper opening rim 118.

The coffee, or other type, of grounds to be brewed are stored in a hopper 57 which may be formed of rigid material but preferably is formed as a plastic bag in which the coffee may be purchased and which has a tapered upper end terminating in a sealed outlet opening. When the coffee is to be used in the machine the plastic bag is inverted and hung by means of spring hooks 73 inserted in openings in the body of the bag separated from the coffee housing portion. The upper ends of the springs 73 are hooked over support members 72 fixed to the upper part of frame 79. The mouth of the bag is unsealed and slipped over rim 118. A conically shaped ring 123 is provided for holding the bag mouth tightly in place on the frusto-conical rim 118 of the funnel member 56.

In the conical receiving member 56 is a shaft 62 turning on bearings in the walls of said member, said shaft having affixed thereto agitator vanes 63, see FIG. 3. Surrounding the bottom end of the funnel 99 is a guide collar 104 secured to the infusor pump by bracket arm 104a, thus the collar 104 reciprocates up and down with the infusor pump so as to properly guide falling grounds from the bottom of funnel 99 to receiving elements to be described.

Advancing member

Positioned beneath the reciprocating infusor pump is an intermittently rotating member 29 whose function is to advance grounds from one station to another in each brewing cycle and to repeat the cycles as often as desired. Member 29 as best seen in FIG. 2 comprises a hub 29a defining an axial bore for the shaft 80 which is journalled at opposite ends in bearings 232 and 233 in the vertical frame members. The hub is fixed to shaft 80 by a screw 231, or other suitable means.

In the illustrated embodiment four arms integral with the hub 29a extend radially from the shaft and are integrally secured to side members 221–224 each formed with a large, central, dish-shaped cavity 84 having a bottom opening in which is inserted an outlet pipe 236. The pipes 236 are adapted to feed brewed beverages to the funnel 86 fixed to the frame of the machine and having an outlet outside said frame above a seat for a cup to be filled with the brewed beverage.

Figure 4:
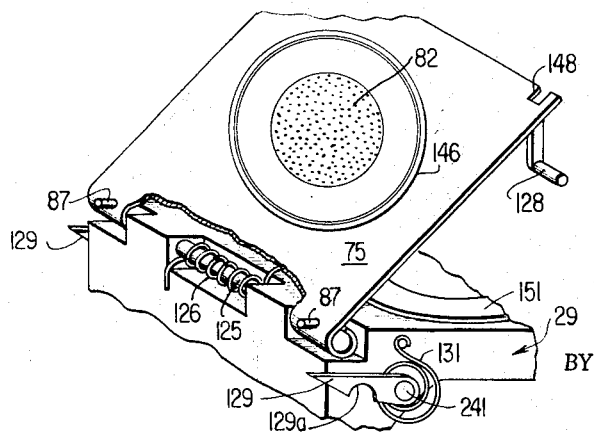
FIG. 4 is a fragmentary perspective view of the advancing member.

Each cavity 84 of the four sides 221–224 of the advancing member 29 is closed by a swingable cover plate 75 having a dish-shaped central strainer portion 82 adapted to seat within the cavity 84 and whose function is to receive and hold the coffee grounds. Each face of the advancing means 29 has a gasket 151 between said face and the spring cover plate 75 to prevent dripping as well as to serve as a cushion when the pump exerts pressure against the spring cover plate 75. The perforations in the strainer portion 82 permit brewed coffee, or other beverage, to pass to the outlet pipes 236 and funnel 86. Each cover plate is swingable with respect to advancing member 29 rotating with an axle 125, FIG. 4, secured to the plate at one end. The axles are each journalled to member 29 extending along a corner edge thereof, and each plate is urged away from the member 29 by a coil spring 126 surrounding the axle and having one end bearing on the member 29 and the other end bearing on the underside of the cover plate 75.

A pair of short pins 87 protrude upwardly at a slant from opposite sides of the journalled end of each cover 75. These pins function to engage in side perforations in a filter strip, or tape, to be later described. A shaft 241 parallel to shaft 125 passes through member 29 near each of its four corners and on the ends of these four shafts which protrude from the adjacent side faces of the member 29 are fixed catches 129. Each catch 129 is urged to a limiting position by a coil spring 131 hooked at its respective ends to the catch shaft and to the member 29. Each catch 129 is provided with wedge-shaped end and a semi-circular shape hook slot 129a adapted to engage over a pin 128 fixed to and extending below and outwardly from the adjacent edge of the preceding cover 75. To accommodate pins 87 as a cover swings outwardly each cover is provided with slots 148 in its edge opposite the hinge axle 125.

It will be apparent that the cover 75 at the top of advancing member 29 in FIG. 1 is held closed against the side 221 of member 29 by the pair of adjacent latches 129. This is the position of the cover when it is in the infusing station 90. A pair of bracket arms 135, positioned at the left of member 29 in FIG. 1, have pins 135a which engage the wedge shaped ends of the catches 129 to lift them out of locking engagement with pins 128 when the member 29 rotates 90°, at which time the released cover 75 will be swung outwardly by the springs 126 and away from member 29. A similar function is performed under certain circumstances by brackets 124 and pins 124a.

The grounds receiving, infusing, and emptying stations

Referring more particularly to FIG. 1, the grounds receiving station is indicated at 130 directly under the coffee measuring chamber 55 and its outlet funnel 99. An advancing member cover plate 75 arrives at this station in horizontal position as shown, the latches 129 serving to close the cover to the side of the advancing member having been previously released. The cover plate 75 is therefore free to receive a measured quantity of grounds into the strainer 82. When the advancing member 29 next rotates 90° counterclockwise this cover will move with it, but its outer end will be held down and guided by the pair of inclined guide plates 83 so that when the 90° turn is completed and the infuser pump portion 23 moves downwardly to engage the annular gasket 13 about the rim 146 of the strainer 82, the cover plate will be pressed down and the pins 128 will ride down the latches 129 forcing them outwardly and then releasing them to catch and hold the cover plate closed. In this condition, the said strainer cover 75 is in the infusing station 90. If desired, the free edges of plates 75 may be provided with small rollers to facilitate movement along the guides such as 83.

Near end of next 90° rotation of the advancing member 29, the pins 135a will unlatch the catches 129 and the cover plate 75 will swing outwardly to the horizontal position, shown at the bottom left of FIG. 1, thus arriving in the emptying station 133. The swinging movement is stopped by a rubber abutment member 136 and the switch 240 placed under or adjacent said abutment member. The function of switch 240 will be described later. The abrupt stopping of the cover plate against abutment 136 serves to jar the used grounds out of the strainer portion 83 so that they fall into funnel 138 seated under an opening 137 in the frame. The funnel leads the waste grounds to a drain or to a disposal receptacle. In the emptying station is also positioned a sprinkler head 139 suitably connected to the source of main pressure through solenoid valve 240a, FIG. 6. Thus, actuation of the switch 240 by bumping energizes the solenoid and opens the valve to allow water at main pressure to be admitted through the sprinkler 139 against the strainer 82 of each cover plate as it strikes the abutment 136 in the emptying station 133.

When the advancing member 29 again rotates 90° the just emptied cover 75 is carried therewith into a partly closed position with respect to face 223 as shown in station 156, the edge of the cover plate opposite to the hinged edge being guided along a straight guide 141 having a curved end portion.

In the next quarter turn of the advancing member 29, the emptied strainer plate will move from station 156 to its horizontal position in station 130, the outer free edge of the plate riding first along the floor of frame 79, then along a curved portion followed by a substantially vertical and straight portion of guide 141a.

The infuser pump drive train

To drive the various elements of the machine described above in a brewing cycle, there is provided an electric motor 78 fixedly supported in frame 79. The motor is provided with a suitable reducing gearing having an output axle and output sprocket 155 linked by a chain 155a to a sprocket 46 on the driven shaft 66, FIG. 2. Shaft 66 drives shaft 66a through sprockets 217 and 67a connected by chain 218. Fixed to shaft 66a is a cam disc 41 having an eccentric cam roller 38. Around the periphery of disc 41 is an annular cam ring 39 having a protuberance 39a for actuating the switch 44, FIG. 1, as well as other parts.

As seen in FIG. 1, a curved lever arm 37 is hinged at one end about pivot 40 carried by frame support cross arm 79a. The free end of the lever rides between the cam rollers 38 and 36, the latter being journalled in piston rod 33. Thus, rotation of the cam wheel 41 in a clockwise direction, as shown in FIG. 1, will reciprocate the piston rod and attached piston vertically compressing the spring 31 in the pump cylinder on the upstroke of the piston 30.

The described driven shaft 66a, FIG. 2, has affixed thereto a cam 45 engaged by a follower cam roller 112 in turn supported from the chassis frame by a pivoted lever 109, best seen in FIG. 3. The cam 45 is an eccentric which raises and lowers cam follower roller 112 carrying a split, or framelike member 11 connected to the follower by the axle thereof. The lower end of the frame member 111 is pivoted at 113 to the upper end of the rod 114a of a piston element 114b carried in a spring adjusting member 114. The member 114 comprises a cylinder enclosing spring 114c compressed to a desired pressure between the piston element 114b and the opposite, upper wall of the cylinder. The cylinder also carries a threaded bolt 114d which is adjustably screwed into an end bore in lever 114e pivoted to one end lever 28. The lever 28 is centrally pivoted on the pin 108 and has its opposite end forked as at 143 to surround pump cylinder 11. Each fork has tines engaged about coupling studs 144 carried by the telescoping section 11 of the infusor pump. Thus, rotation of the shaft 66 engenders a lifting and lowering reciprocation of the pump cylinder 11, through the cam follower 112 and the lever 28, to move the infusor pump from and into sealing engagement respectively with a strainer portion 82 of the plate 75 situated on the advancing member 29 in the infusing station 90.

Dispenser drive train

A cam follower roller 42a is journalled on the free end of lever 42 which turns about the pivot 48, see FIGS. 1 and 3. The lower end of lever 42 is pivotally connected to one end of the link rod 50, the other of which is pivotally secured to a lever 51 so as to turn the latter about axle 71 and attached ratchet wheel 53. Counterclockwise movement of the lever 51 in FIG. 3 is opposed by the spring 74. A pair of pawls 52 and 105 are pivoted to lever 51 and the coffee dispenser 55 respectively and biased to turn axle 71, carrying the measuring chamber vanes 54, in one direction only. Thus, each time cam 39 makes one rotation to engage cam 39a against follower 42a, lever 42 will be oscillated to move the measuring vane shaft 71 through 90°.

The dispenser may be placed out of operation by pushing a rod 301 which carries wedge 302, and is urged upwardly by spring 303. A flange 304 on the rod seats one end of another spring 305 surrounding the rod and whose other end engages fixed bracket 307 to urge the rod outwardly. The inner end of rod 301 has a flange 306 which engages link 51. When rod 301 is pushed inwardly, wedge 302 locks behind the frame wall being pulled upwardly by spring 303 and spring 305 is compressed. This movement of rod 301 pushes link 51 and thereby lever 42 to remove the follower 42a from cam 39, 39a, setting the coffee dispenser 55 out of action. When it is desired to reactivate the dispenser, rod 301 is pushed downwardly to free wedge 302, whereupon spring 305 pushes the rod outwardly. This frees link 51 pulled by spring 74 to move and re-engage follower 42a with cam 39a. Rod 301 may be utilized in the same manner to deactivate the coffee dispenser when the machine is to be cleaned, in which case the machine is cycled several times but without coffee grounds so that clean water is supplied through all the conduits to flush the machine completely clean.

A sprocket 65 is fixed to shaft 71 and linked by a chain to a sprocket wheel 64 on shaft 62 carrying the agitator vanes 63. With this arrangement each time the measuring dispenser is moved 90°, the agitator vanes 63 will also be turned to feed grounds from the plastic hopper 57 into one of the chambers in the dispenser 55.

The advancing member drive train

Referring particularly to FIGS. 2 and 3 the advancing member 29 is driven from shaft 66a by a sprocket 67 fixed thereto and a chain 220 connecting sprocket 67 to sprocket 68 on a parallel lower shaft 221. Fixed to shaft 221 is a gear 69 having only a partial peripheral sector 261 formed with gear teeth which mesh with the spur gear 70 fastened to the shaft 80 of the advancing member 29. Thus, each time the driven shaft 66 is rotated through one revolution, the advancing member is rotated through a quarter of a revolution when the toothed segment 261 meshes with the teeth of spur gear 70. To hold the advancing member 29 in each of its four angular positions, a star wheel 96 provided with four depressions 225 in its periphery is secured to the shaft 80. Riding in these depressions is a roller 226, journalled in the end of lever 97 whose other end is pivoted at 228 to the base of the frame 79. A spring 227 urges the lever so as to press the roller 226 into the depressions in the perimeter of the star wheel. When the shaft 80 is rotated 90° there is sufficient force to stretch the spring 227 and lift the roller 226 out of the depression in which it is engaged to ride on the perimeter of the star wheel to the following depression. When the tooth segment 261 disengages the spur wheel 70, the spring 227 urges the roller 226 into the next depression and securely holds the shaft and the advancing member from further rotation until the next quarter turn is imparted to shaft 80.

The drive for electric switches

The piston rod 33 has a cross bore journalling the axle 93, FIG. 2, which carries cam roller 36 at one end and a pin 94a at the other end. When the piston rod 33 reciprocates vertically, axle 93 is rotated by roller 36 and moves vertically in a slot 93a formed in a vertical support 93b secured to the frame 79. The pin 94a is thus enabled to engage and close safety switch 94 at the bottom of the stroke of piston rod 33.

A start switch 95 is shown in FIG. 2 at the left side of the frame 79. This switch is connected in series with the safety switch 94 previously described.

The switch 44, FIG. 1, is a stop switch which is opened by the cam protuberance 39a once each revolution of the cam wheel 41 to stop the motor and the rest of the drive train. A normally closed switch 260 is in series with switch 44 and is operated to momentarily open by cam 39a to stop the motor during each brewing cycle for a reason to be later explained.

The switch 240 shown in FIGS. 1 and 6 and which operates a sprinkler is closed by plates 75 striking bumper 136 upon reaching emptying station 133.

Operation

To operate the machine the starter switch 95 is momentarily pushed to close the electric circuit to motor 78, switch 94 being held closed by pin 94a on the lowered pump rod 33. Once the motor starts, the cam 41 will turn sufficiently to disengage cam 39a from stop switch 44 so as to close switch 44 and hold the circuit energized. Switch 95 resumes an open position and pin 94a, secured to pump rod 33, disengages switch 94 which opens to shut off the current to start switch 95.

The motor 78 moves cam 41 by previously described means and begins to lift shaft 33 with piston 30. As piston 30 moves upwardly it begins to compress spring 31 at the same time cam 45 and lever 28 release their downward pressure on the infuser head 11, so that the upwardly moving piston lifts the infuser head. At this time cam 39a moves lever 42 to step the measuring vanes 54 of the coffee dispenser 55, by means of pawl 52 and ratchet 53, to discharge a measured quantity of ground coffee through funnel 99 directly to a strainer 82 in station 130. Immediately thereafter, teeth 261 of the partial gear 69 engage the gear 70 to move the advancing member 29 one step carrying along in this movement to station 90 the spring cover plate 75 situated at the receiving station 130 and which has just received the grounds from the dispenser 55. The partial gear 69 disengages the spur gear 70 and the advancing member 29 is stopped and held in steady position by the star wheel 96; thereafter, cam 45 again moves the lever 111 lowering the infuser head against the plate 75 on the advancing member 39 in station 90. When the pump 11 is lowered, the rollers 14 also descend and press the plate 75 against the advancing member to be latched in place by engagement of catches 129 over pins 128, while the pump gasket 13 lowers and sealingly engages the rim 146 of strainer 82.

On this same step of the advancing means 29, the plate 75 that was previously under the pump 11 at station 90 is turned with member 29 until just before completion of 90° of rotation, the pins 135a in abutment 135 engage the catches 129 camming them open to release plate 75 which springs outwardly to emptying station 133 hitting against the rubber bumper 136 and as a result, the grounds in the strainer 82 of this plate are thrown downwardly through the funnel 138 to the drain, sink, bag, or other disposal means. When plate 75 hits the rubber bumper 136 switch 240 is closed to momentarily energize the solenoid valve 240a, FIG. 6, to operate the sprinkler 139 and rinse the strainer 82. Immediately after the plate 75 hits the rubber cushion, the switch returns to its open condition by the expansion of the rubber abutment 136.

On the same step of the advancing member 29, the plate 75 that was at station 133 moves to blind station 156 guided at its free end by parallel guides 141. Also in this same step, the plate 75 which was in station 156 slides on guides 141a and moves to the receiving station 130 to receive the next measured quantity of grounds to be brewed.

As the pump gasket 13 reaches plate 75 it seals the pump chamber 24 below piston 30 to the rim 146 of the strainer filled with coffee grounds, to hold the hot water which is to enter chamber 24 when the piston rises above the ducts 18, 19. The piston 30 continues its upward movement and just before reaching its uppermost position, operates as an automatic valve allowing the boiling water to enter into the chamber 24 from the expansion 21 so the hot water fills the chamber 24 quickly. A float-type check valve 153 connected to expanded portion 16 of pump 11 helps to avoid counterpressure in chamber 24 if the water, either from the bottle or city water main, lacks pressure. The perforated plate 145 at the bottom of the pump prevents the grounds from entering into the pump when the chamber 24 is filled with water.

As roller 38 on cam 41 reaches the uppermost position and begins its turn downward releasing the pressure against lever 37 and leaving rod 33 free, the spring 31, compressed to its maximum will be released to push the piston 30 down, thus forcing the water from chamber 24 through the coffee grounds to perform the brewing. Cam 41 with roller 38 continues to turn to complete a whole turn at which time cam 39 opens the stop switch 44, stopping the motor 78. The starting switch 95 cannot energize the motor for a new brew until the piston 30 reaches its lowermost position and pin 94a in rod 33, of piston 30, closes the safety switch 94. After the brewing is performed, the starter switch 95 may then be pushed to start the next cycle.

Additional structure for varying the mode of performance

If desired the machine may be used with prepackaged dry beverage grounds secured to a flexible tape such as described in my Patent 2,939,380, granted June 7, 1960. The package of grounds 309 shaped to fit strainers 82 are secured on a tape 310 formed of filter paper, or other pervious material. The tape is perforated along its edges at properly spaced locations with openings 311, FIG. 11, of such diameter as to receive the pins 87 on the cover plates 75 of the advancing means 29. Desirably, the tape 310 remains stacked in its shipping carton 214 having an opening near its top adjacent to an opening 91 in the frame 79. The upper end of tape 310 is fed through opening 91 between the rollers 103 and 242 and over the horizontal cover plate 75 in one or both stations 130 and 90 with the packages of grounds 309 seated in the strainers of said pair of cover plates and pairs of edge apertures 311 receiving the pins 87. The bracket arm 135 is turned on a support pivot, unnumbered, to move the pin 135a preferably counterclockwise and out of position to engage the catches 129. At the same time the funnel 138 is slid along guides to a position, as shown in FIG. 8, under the advancing member 29 leaving the opening 137 free for downward passage of the tape 310. Rod 301, FIG. 3, is pushed inwardly to inactivate the coffee dispenser 55. Thus prepared for operation with tape 310, each quarter turn of the advancing member 29 will allow hot water to pass through the prepackaged grounds on the tape in the strainer located in the infusing station 90, and the next 90° revolution of the advancing member 29 will bring the following cover plate with its seated package of grounds 309 into the infusing station while the brewed grounds will move with the preceding cover plate 75 to extend vertically so that the used grounds may be passed vertically downwardly to a waste receptacle, in the same manner as shown for tapes 58, 58a in FIG. 8. This vertical movement is engendered by the pins 87 carrying the tape 310, the driving cover plate not being released to spring outwardly by reason of the movement of the pin 135a out of the path of latches 129. The angles of pins 87 with respect to plates 75 is such as to release the tape 310 to pass downwardly through opening 137. The latches 129 remain holding the cover plates until they release upon engagement with cams 124 in position 156. Since the cover plates 75 do not spring out to their positions in station 133, the abutment 136 and sprinkler 139, which remain in place, although omitted in FIG. 8, do not function.

As an alternative, referring to FIG. 3, a strip 310 with prepackaged grounds 309 may be mounted on a spindle 81 in one compartment of box 76 which is rotatably secured at the top of the frame by means of a pivot 73. The strip may be fed vertically downwardly through aligned openings 243 in the frame and the box 76 and under the roller 14, FIG. 1, to dispose the leading package of grounds in the cover plate 75 situated in the infusing station 90 with the strip perforations 311 engaged about the pins 87. The prepackaged coffee may thus be fed vertically downwardly along the infuser pump to be advanced by the advancing member 29 each time it revolves just as described previously.

The machine also is so constructed that grounds may be packaged as the machine operates in the brewing cycle, see FIG. 8. To do this, the box 76 is turned on pivot 73 and reversed bringing a second compartment to the front as illustrated in FIG. 1. This compartment has two spindles 59 and 60 each mounting a roll of plain filter tape having perforations in the side edges such as 311 as described for the prepackaged coffee tape. One tape 58 is guided down over roller 88, under roller 85, across the cover 75 in the grounds receiving station 130 to lock the pins 87 in the perforations of the tape. Desirably, tape 58 is formed with pockets or concavities that seat in strainers 82. The second tape 58a is fed between a pair of rollers 88a through the aligned openings 243 over roller 85a and under roller 14 to lock its perforations on the pins 87 of the cover plate 75 in the infusing station. Thus, when the machine operates in the manner previously described, coffee grounds are fed from dispenser 55 through the funnel 99 to fall on tape 58 overlying the strainer of the plate in the station 130. When the advancing member 29 turns 90°, this measured quantity of coffee grounds is carried with the associated strainer 82 to the infusing station where the upper tape 58a is pressed down upon the lower tape 58 by the lowered infusing pump 11 and hot water is forced through, the grounds and the upper and lower tapes being more or less bonded together by the infusion. After the brewing, both tapes are carried around to a vertical position in the next movement of the advancing member and thus, as succeeding cycles of brewing occur, the waste grounds are carried downwardly into a waste receptacle. It is apparent that the use of either the tape with prepackaged grounds, or the individual tapes 58 and 58a, which package grounds as the machine operates, avoids the operation of the sprinkler 139 because the plates 75 passing from the infusing station are retained latched against the advancing member 29 and do not spring outwardly into the emptying station 133. Use of these tapes therefor provides a cleaner operation and avoids the need for cleaning, or rinsing, the plates 75.

Similar advantages may be obtained by using only a single tape 58 without the cover tape 58a. When this is done tape 58 alone is fed vertically downwardly through opening 232 and under roller 85 and then horizontally to lock onto the cover plate in the grounds receiving or infusing station, in the manner previously described when both tapes are utilized. After feed of grounds to the portion of tape 58 on the strainer 82 of the cover plate 75 in the receiving station 130, the next quarter turn of the advancing member 29 moves this plate with the tape 58 and the coffee to the infusing station without being covered by a second tape 58a. After brewing, the single tape with the coffee is carried around for vertical discharge as previously described for the two tapes, there being no second covering tape, engaged over the first tape to retain the coffee grounds in sealed pockets.

Modified drive structure and modified infuser pump

FIG. 7 illustrates a modified infuser pump and means for driving the same. The modified pump is similar to the pump illustrated in FIG. 1, as previously described, except in the following respects. The piston rod 33 has as its lower end a partial bore 49 which houses a ball end 107 of an auxiliary piston rod 61 terminating in the ball end 110 connected to the piston 30. The spring 31 is clamped between the piston 30 and a flange 34 fixed to the piston rod 33, the ball 107 seating in the bottom of a threaded coupling nut 47 which is adjustable along rod 33 to vary the compression of the spring 31 and for limiting the downward movement of the piston. Thus, when the piston is elevated from its lowered position in FIG. 9a the spring is not compressed as it forms, a rigid assembly with the piston 30 and rod 33. When, however, the piston rod 33 is lowered, as shown in moving from the position of FIG. 9c to that of FIG. 9d, ball 107 and connecting rod 61 pass upwardly into the bore 49 of the piston rod compressing the spring 31 on the down stroke. Since hot water from the cylinder chamber 24 passes with difficulty through the perforated plate 145 and the grounds in the cover plate 75 in the fusing station, the compressed spring 31 will uncoil and continue the pressure after the piston rod has reached the bottom limit of its travel to force the piston further down and the hot water completely from chamber 24 and through the grounds.

The pin 94a for actuating the switch 94 is carried on a vertical rod 93b secured to the piston body 30. The cam for moving piston rod 33 is also modified. Two cams 41a and 41b spaced apart are utilized instead of the single cam disc 41 shown in FIG. 1. A straight lever 37a has one end movably supported between rollers 36a and its center pivoted at 37b to a portion of the frame structure. The other end of the lever 37a is movably mounted between a pair of spaced rollers 35 carried at the upper end of a rectangular shaped member 17 which is guided in vertical oscillations by levers 12 and 43 pivoted at 27 and 25 to the frame 79 and pivoted at their opposite ends to the axled cam follower rollers 38a and 38b, respectively, at the bottom and top of the member 17. The driven shaft 66 has fixed thereto the pair of semi-elliptical cams 41a and 41b which respectively engage the rollers 38a and 38b. It is apparent that rotation of shaft 66, through the eccentric cams 41a and 41b, will operate to lower and lift the member 17 and thereby turn the lever 37a to lift and lower the piston rod 33.

FIG. 8 shows the machine having the pump and piston in its lowermost brew starting position against the advancing member 29. When the piston 30 starts rising, FIG. 9a, it carries along the pump cylinder skirt 23 to raise the latter from the advancing member 29, which is then free to turn. In FIGS. 8 and 9a the piston 30 starts going upward together with spring 31 without compressing said spring, as they form a rigid assembly, as more clearly shown in FIG. 7.

Figure 5:
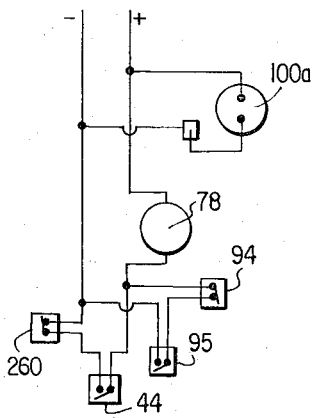
FIG. 5 is a diagram of the electrical circuit for operating the machine.

In FIG. 9c the piston reaches its highest position allowing boiling water to enter chamber 24 through the water conduits 18 and 19 as, at this moment, the motor is cut off temporarily by switch 260 for just a few seconds to facilitate the further dampening of the grounds in the strainer 82 to form a cake. Switch 260, FIG. 3, is actuated by cam 39a to open the motor circuit, FIG. 5, momentarily.

In moving from FIGS. 9c to 9d the cam mechanism moves the piston rod downwardly compressing the spring while rod 61 and ball 107 move upwardly into bore 49 of rod 33, this occurs because the piston is carried downward to expel the water toward the ground coffee, but as the ground coffee blocks the tiny holes in the strainer 82, it offers resistance to the passage of the water, therefore, said water in chamber 24 also offers resistance to the piston, and the piston can not come down rapidly even though rod 33 continues moving downwardly. Spring 31 begins to compress and continues pressing the piston downwardly to expel all the water from chamber 24 through the ground coffee, until rod 33 reaches its lowermost position where it remains steady. Thus, the spring 31 is free to expand when in the position of FIG. 9d so as to carry piston 30 further down and continue to propel the hot water from chamber 24 in the cylinder through the grounds until the piston rod 33 rises again to the position as in FIG. 9a. The described movements of the cams and piston are repeated in succeeding brewing cycles.

FIGS. 10a–d diagram similar stages of a brew cycle for a pump and drive such as that of FIG. 1. In FIGS. 10a and 10b piston 30 starts upward compressing its spring 31. This is better undertood from FIG. 1 wherein one end of said spring 31 is encased on the inside bottom of piston 30 while the other end rests against the upper end of cylinder base 11a fixed to the frame 79a, therefore, when the piston rises it has to compress spring 31. In both embodiments of the pump the spring 31 continues to force water from chamber 24 of the pump after the piston has reached its lowest position as moved by its respective cam mechanism.

While the advancing member 29 has been shown and described as being a square or rectangular member having four sides, it is apparent that the number of sides may be varied. For example, the member may be made hexagonal as shown at 29a in FIGS. 10a–d. Of course, when this is done the angular rotation of the advancing member and the drive therefor must be modified so that each side in turn is moved from one station to the next, a hexagonal member requiring only a 60° movement rather than a 90° movement in each step.

It will be readily apparent from the above description that the device according to the invention provides a compact machine all of whose elements are very small and which fit and operate closely in a very compact space. Since each element is linked to the other elements by a mechanical drive to operate in appropriate time sequence, the machine is certain of operation and will perform for long periods without the need to provide maintenance as would be necessary for a machine having the brewing cycle primarily determined by unmechanically related electrical or electronic elements, for example. The small, rotating advancing member 29 also has the advantage that it is equally suitable to receive and infuse grounds, or to receive and move prefabricated tape with the grounds packaged in pockets therein, or to receive and move a single tape or a pair of tapes for assembling a package of grounds in the machine as it brews. The construction of the two described embodiments of the infuser pump and cam drives are such that the infuser pump acts as its own automatic valve for admitting hot water to the pump and then forces said hot water under a prolonged pressure period by the spring 31 through the grounds to prolong the brew time and improve the brew.

The described machine may obviously be combined with additional conventional elements such as cup dispensers, sugar, cream and other additive dispensers and coin controls to provide an automatic coin operated machine for dispensing one or more different brews.

Although certain specific embodiments of the invention have been shown and described, it is obvious that many modifications thereof are possible. The invention, therefore, is not to be restricted except insofar as is necessitated by the prior art and by the spirit of the appended claims.

What is claimed is:

1. In an automatic beverage brewing and dispensing machine, the combination of a hopper for beverage grounds, means for dispensing a measured amount of said grounds from the hopper, a grounds receiving station, an infusing station, a grounds emptying station, and an advancing member arranged to receive grounds at said receiving station, move the grounds to said infusing station, empty the grounds at said emptying station and return to said receiving station, said advancing member being an intermittently rotating body having a plurality of sides, each side having a cavity and a swingable cover movable to close said cavity and including a strainer portion for receiving grounds from said dispensing means, said covers being hinged to said advancing member, means biasing each of said covers away from its associated side, and a releasable catch for holding each cover in side closing condition when in said infusing station.

2. The combination claimed in claim 1 and further comprising means for supporting a roll of filter tape, means for guiding said tape to said receiving station, means on said endless carrier to grip and move said tape.

3. The combination as claimed in claim 2 wherein is further provided a supporting frame, and said means for supporting tape comprises a container having an exit opening and pivoted to said frame, two compartments in said container each having exit openings, one of said compartments housing a single roll of tape having prepackaged beverage grounds secured thereto, the other compartment enclosing two rolls of said tape without grounds, said container being pivoted to said frame to align selected exit openings with tape guide means in said frame, whereby a single tape may be fed to said receiving station to receive grounds and the container may be turned so that two tapes may be fed to said receiving and infusing stations in position to receive and hold measured quantities of grounds between the tapes.

4. The combination as claimed in claim 2 wherein said means to grip said tape comprises a pair of pins mounted on said swingable covers and engageable in openings in the sides of said filter tape.

5. The combination as claimed in claim 1 wherein is additionally provided means for feeding and guiding to said infusing station a strip of filter material having prepackaged grounds secured thereto, and means for rendering inoperative said grounds dispensing means.

6. The combination as claimed in claim 5 wherein said grounds dispensing means includes a cam driven lever pivoted to a link in turn pivoted to a shaft carrying a ratchet and vanes defining measuring chambers, said link carrying a drive pawl engaging said ratchet, and said means rendering inoperative the grounds dispensing means includes a movable rod having a portion engageable with said link upon movement of the rod to disengage the said lever from its cam.

7. The combination as claimed in claim 1 wherein said intermittently rotating body forming the advancing member comprises a hub mounted on a shaft, a plurality of arms projecting from said hub each carrying a funnel-like side member to which said covers are hinged, a fixed spout positioned adjacent said rotating body for delivering brewed beverage away from said rotating member and an outlet opening in each of said side members arranged to feed brewed beverage to said fixed spout when the funnel-like side member is in the infusing station.

8. The combination set forth in claim 7 wherein said advancing member comprises four funnel-like side members arranged to form a square, each of said covers on said side members opening to a horizontal position to receive grounds when in said receiving station, means for moving said covers against the advancing member when the latter moves a cover to the infusing station, latch means for holding each cover in closing condition against the advancing member when in said infusing station and release means for unlatching each cover to swing toward said emptying station when the cover moves from the infusing station, abutment means in said emptying station for abruptly stopping each cover as it reaches said emptying station to throw out grounds to a waste deposit.

9. The combination as set forth in claim 1 wherein is additionally provided an infusing pump comprising a cylinder, a piston in said cylinder, means for reciprocating said cylinder toward and away from said intermittently rotating advancing member, means for reciprocating said piston within the cylinder, and hot water intake means in said cylinder opened and closed by movement of said piston.

10. The combination set forth in claim 9, wherein said means for reciprocating said piston comprises a motor connected to a drive shaft, cam means on said shaft arranged to reciprocate a rod connected to said piston, and spring means in said cylinder urging said piston toward said advancing member.

11. The combination set forth in claim 10, wherein is additionally provided mechanical means connecting said motor to said cylinder, said advancing member and said grounds dispensing means to intermittently reciprocate said cylinder, and rotate said advancing member and measuring means in a beverage brewing and dispensing cycle.

12. The combination set forth in claim 11 wherein said mechanical means connecting said motor to said advancing member comprises a shaft on said rotating body, a first spur gear fixed on said shaft, a second spur gear having only a portion of its periphery provided with teeth for mating with said first spur gear, a second shaft fixed to said second spur gear and sprocket and chain means connecting said second shaft to said motor, whereby each revolution of said second shaft only partially rotates said advancing member so as to successively advance each side to the infusing station.

13. The combination set forth in claim 11 wherein is additionally provided an electrical circuit for operating said motor including a start and safety switch connected in series with said motor, means to close said safety switch only when said piston and cylinder of the infuser pump are positioned at the end of a brewing cycle, a normally open stop switch connected in series with said motor and adapted to close by engagement with cam means actuated by said motor once the motor has started, said stop switch being again actuated to open by said cam means when the motor has moved said piston and cylinder of the infuser pump through one complete brewing cycle.

14. The combination set forth in claim 13 wherein is additionally provided a normally closed switch in series with said stop switch and motor and arranged to be briefly opened by said cam means during each brewing cycle so as to increase the time of dwell of said piston while said hot water intake means is opened.

15. The combination as set forth in claim 10 wherein said cylinder of the infusing pump is disposed vertically and includes a fixed portion and a telescoping portion, said piston rod being connected to the piston by a ball joint, said spring means being disposed around said rod between said piston and said fixed portion of the cylinder, a lever connected to said cam means and arranged to elevate the piston rod and compress said spring, and said cam means and lever releasing the piston rod at its uppermost position to allow said spring to push the piston and water in the cylinder downwardly into and through grounds in a cover positioned in said infusing station on said advancing member.

16. The combination set forth in claim 10 wherein said piston rod is formed by two telescoping elements arranged one above the other, the upper element having a cavity which receives an upper ball fixed on the upper end of the lower element, said lower element having a lower ball at its lower end secured to said movable piston in said cylinder, said spring surrounding said two elements and being disposed between the piston and a supporting collar formed on said upper element, a threaded hollow nut adjustably securing said upper ball within the cavity of the upper element, whereby upon downward movement of said piston rod its lower element telescopes within the upper element and compresses said spring due to the presence of hot brewing water in the lower part of said cylinder, said spring ultimately expanding and forcing brewing water out of said cylinder through grounds held in a cover positioned in the infusing station on said advancing member.

17. The combination set forth in claim 9 wherein said means for reciprocating said piston comprises a cam shaft driven by said motor, a pair of cams on said shaft, a rectangular member having upper and lower cam followers disposed to be lifted and lowered by said pair of cams, a lever centrally pivoted on the frame, a pair of rollers secured to said rectangular member and disposed on each side of one end of said lever, and the other end of said lever being disposed between a pair of rollers carried on the upper end of said piston rod.

18. The combination set forth in claim 17 wherein said motor is provided with a start switch and a stop switch, said stop switch being arranged to be actuated by an additional cam to stop the motor when said cam shaft having said pair of cams has made one full turn.

19. The combination set forth in claim 1 wherein said hopper comprises a plastic bag having at least one eyelet at the bottom for receiving a spring hook the other end of which is supported from said frame, the upper end of said plastic bag having a frustro conical shape terminating in a vacuum sealed outlet when the bag encloses beverage grounds for storage, said bag being supported in an inverted position from said frame with the sealed outlet opened and secured about an inlet neck of said means for releasing a measured quantity of grounds from the hopper.

20. The combination set forth in claim 1 wherein is additionally provided rinse means to direct cleaning water to said covers when in said emptying station, and means engaged by said covers when in said emptying station for actuating said rinse means.

21. The combination set forth in claim 20 wherein said rinse actuating means comprises a switch and a resilient member forming an abutment stop engaged by an outwardly swinging cover when it reaches said emptying station, and a solenoid valve connected in a conduit between a source of water and said sprinkler, said switch when struck by said cover operating to close and energize the solenoid valve so as to supply rinse water to said sprinkler.

References Cited

UNITED STATES PATENTS

| | | | |
|---|---|---|---|
| 2,730,034 | 1/1956 | Svendsgaard | 99—283 |
| 2,943,556 | 7/1960 | Egi et al. | 99—289 |
| 3,103,873 | 9/1963 | Breitenstein | 99—289 |
| 3,208,369 | 9/1965 | Greenly et al. | 99—283 |

WALTER A. SCHEEL, *Primary Examiner.*

R. W. JENKINS, *Assistant Examiner.*